(12) United States Patent
Feng et al.

(10) Patent No.: US 9,323,079 B1
(45) Date of Patent: Apr. 26, 2016

(54) OPTICAL DEVICE HAVING ELECTRO-OPTIC SILICON MODULATOR ON LARGE CORE FIN WAVEGUIDE AND METHOD TO MAKE THE SAME

(71) Applicant: LaXense Inc., Walnut, CA (US)

(72) Inventors: Ningning Feng, Arcadia, CA (US); Xiaochen Sun, Chino Hills, CA (US)

(73) Assignee: LAXENSE INC., Walnut, CA (US)

( * ) Notice: Subject to any disclaimer, the term of this patent is extended or adjusted under 35 U.S.C. 154(b) by 0 days.

(21) Appl. No.: 14/605,802

(22) Filed: Jan. 26, 2015

(51) Int. Cl.
| | |
|---|---|
| *G02F 1/035* | (2006.01) |
| *G02B 6/42* | (2006.01) |
| *G02B 6/26* | (2006.01) |
| *G02B 6/10* | (2006.01) |
| *G02F 1/025* | (2006.01) |
| *G02F 1/225* | (2006.01) |
| *G02B 6/122* | (2006.01) |
| *G02B 6/12* | (2006.01) |
| *G02B 6/14* | (2006.01) |

(52) U.S. Cl.
CPC ............... *G02F 1/025* (2013.01); *G02B 6/122* (2013.01); *G02B 6/12004* (2013.01); *G02B 6/1228* (2013.01); *G02B 6/14* (2013.01); *G02F 1/225* (2013.01); *G02F 1/2255* (2013.01); *G02F 1/0356* (2013.01)

(58) Field of Classification Search
CPC .. G02B 6/12004; G02B 6/122; G02B 6/1228; G02F 1/025; G02F 1/225; G02F 1/2255; G02F 1/0356
USPC ............ 385/1–3, 28, 43, 45, 49, 50, 129–132
See application file for complete search history.

(56) References Cited

U.S. PATENT DOCUMENTS

| | | | |
|---|---|---|---|
| 7,116,853 B2 | 10/2006 | Gunn, III et al. | |
| 7,136,544 B1 | 11/2006 | Gunn, III et al. | |
| 7,251,408 B1 | 7/2007 | Gunn, III et al. | |
| 7,280,712 B2 | 10/2007 | Liu | |
| 7,394,948 B1 | 7/2008 | Zheng et al. | |
| 7,747,122 B2 | 6/2010 | Shetrit et al. | |
| 8,149,493 B2 | 4/2012 | Chen | |
| 2013/0188902 A1* | 7/2013 | Gardes ................... | G02F 1/025 385/2 |
| 2016/0004104 A1 | 1/2016 | Feng et al. | |

OTHER PUBLICATIONS

U.S. Appl. No. 14/321,376, filed Jul. 1, 2014.

* cited by examiner

*Primary Examiner* — Akm Enayet Ullah
*Assistant Examiner* — Michael Mooney
(74) *Attorney, Agent, or Firm* — Chen Yoshimura LLP (57) ABSTRACT

An optical modulator device made on large core silicon fin waveguide platform and its fabrication methods. The optical device includes two silicon optical coupling waveguides each having a lower ridge and an upper ridge, two mode transformers respectively connecting the coupling waveguides with an optical modulator waveguide. The optical modulator waveguide has a silicon fin waveguide structure with a narrower fin structure on top of a wider lower ridge structure. Each coupling waveguide and the corresponding mode transformer form a two-stage horizontal taper structure, namely a taper in the lower ridge of the coupling waveguide and a taper of the mode transformer. The light travelling in the coupling waveguide with majority of light in the upper ridge can gradually shift to the lower ridge of the optical modulator where an electro-optic region is positioned. The electro-optic region changes its optical property in response to an applied electric field.

12 Claims, 6 Drawing Sheets

OPTICAL DEVICE HAVING ELECTRO-OPTIC SILICON MODULATOR ON LARGE CORE FIN WAVEGUIDE AND METHOD TO MAKE THE SAME

BACKGROUND OF THE INVENTION

1. Field of the Invention

The invention relates generally to optical devices. In particular, the invention relates to silicon optical modulators fabricated on large core fin optical waveguide.

2. Description of the Related Art

Optical modulators are the key component in optical communication systems. Optical modulators are devices that convert electrical signals to optical signals. Usually, optical modulators are made of materials having strong electro-optic (EO) effects, i.e. optical property changes that occur in response to the applied electrical signal. Such optical property changes include optical refractive index and optical loss changes. Depending on the EO effects used for modulation, optical modulators may be electro-optic (EO) or electro-absorption (EA) modulators.

Both EO and EA modulators are widely used in optical telecommunication systems. However, traditional modulators are too expensive to be applied to data communication systems, which are much more cost-sensitive. Low-cost optical modulators are highly desirable for next generation data communication systems, especially for 100G and beyond systems.

Silicon based modulators have great potential to lower down the cost based on the following reasons: 1) the silicon wafer processes are very mature processes and very suitable for mass production; 2) silicon wafers are much cheaper and larger than traditionally used III-V wafers. To pursue higher modulation performances, i.e. modulation efficiency, modulation speed, etc., engineers tend to make optical modulators on smaller optical waveguides. However, smaller waveguides face significant difficulties when coupled with other optical components that have much larger optical apertures, which increases packaging cost. An ideal optical modulator should have a smaller core in the modulation region and a larger core in the coupling region to solve the problem. In other words, such modulators are "actively small" and "passively large" structures.

SUMMARY OF THE INVENTION

The present invention is directed to an optical device and related fabrication method that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an optical device which includes: a silicon on insulator substrate; a silicon optical coupling waveguide on the substrate for coupling light in or out of the optical device, the optical coupling waveguide being configured to guide a light in a form of optical mode, the optical coupling waveguide having a double-ridge structure including a lower ridge with a first width and an upper ridge on top of the lower ridge with a second width which is narrower than the first width; a silicon fin optical modulator on the substrate, having a double-ridge structure including a lower ridge and a tall and narrow fin structure on top of the lower ridge, the optical modulator including an electro-optic modulation region inside the lower ridge, the optical modulator being configured to guide a light with a majority portion of the light confined inside the lower ridge, at least a portion of the light overlapping with the electro-optic modulation region, the optical modulator including field source regions configured to sandwich the electro-optic region to apply an electric field across the electro-optic region, wherein at least one optical property of the electro-optic region changes in response to the electric field applied to the electro-optic region; and a silicon mode transformer on the substrate for optically and physically connecting the optical coupling waveguide and the optical modulator.

In some embodiments, the lower ridge of the optical coupling waveguide becomes narrower as it extends in a light propagation direction, and the mode transformer becomes narrower as it extends in the light propagation direction, wherein that the majority portion of the light gradually shifts from the upper ridge of the optical coupling waveguide at an incident end of the optical device to the lower ridge of the optical modulator. In some embodiments, the fin structure has a width-to-height ratio form 1:4 to 1:7.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the invention provide an optical device, in particular, an optical modulator made on large core silicon fin waveguide platform, and methods of forming the same. According to the embodiments of the present invention, the optical device having silicon fin waveguide optical modulator includes: a silicon optical coupling waveguide having double ridge structures, including a first (lower) ridge at the bottom and a second (upper) ridge at the top; a mode transformer connecting the optical waveguide with an optical modulator waveguide; the optical modulator having silicon fin waveguide structure with a narrower fin structure on top of a lower wider ridge structure, such that the light travelling in the optical coupling waveguide with majority of light in the upper ridge can gradually shift to the lower ridge of the optical modulator where an electro-optic region is positioned. The structure of the optical coupling waveguide and the mode transformer form a two-stage horizontal taper structure, the first taper stage being the taper in the lower ridge of the optical coupling waveguide, the second taper stage being the taper of the mode transformer. In the optical modulator, the optical properties of the electro-optic (EO) region change in response to the electric field applied through the field source regions; the EO region includes a vertical-oriented PN junction that responds to the applied field change induced by the free carrier dispersion effect; the field source regions are connected to the horizontally arranged metal electrodes positioned on the opposite sides of the waveguide though doped layers.

In order to achieve high modulation efficiency and high modulation speed, the cross-section structure of the modulator needs to be as small as possible so that the EO region can have larger overlap with the optical mode. A large waveguide is desirable when coupling light from the waveguide into outside optical components, such as optical fibers or optical lens. Such device can be realized by using a silicon fin waveguide structure fabricated on a silicon-on-insulator (SOI) substrate.

Figure 1A:
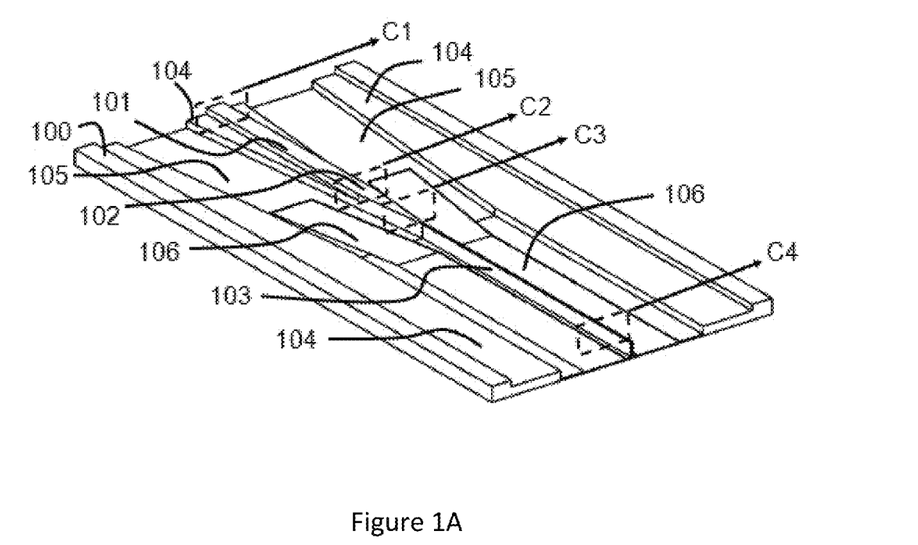
FIG. 1A schematically illustrates a perspective view of a portion of an optical device having an optical modulator made on large core silicon fin waveguide platform according to an embodiment of the present invention.
Figure 1B:
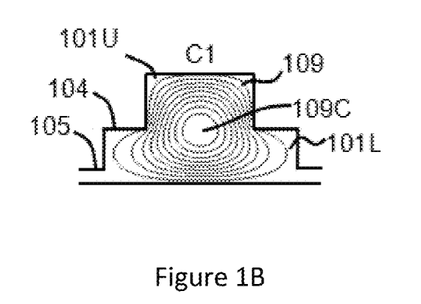
FIG. 1B-1E schematically illustrate the cross-sectional views of the waveguide structures and corresponding optical modes at various locations C1-C4 marked in FIG. 1A.
Figure 1C:
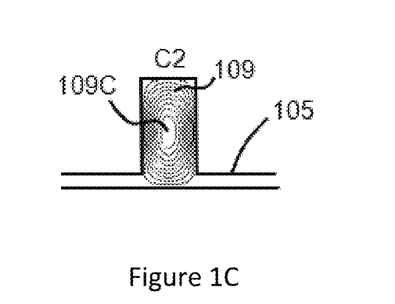
Figure 1D:
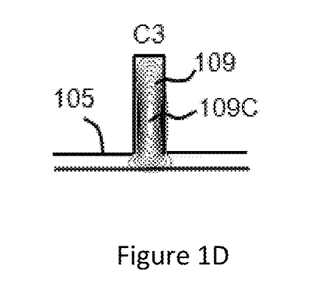
Figure 1E:
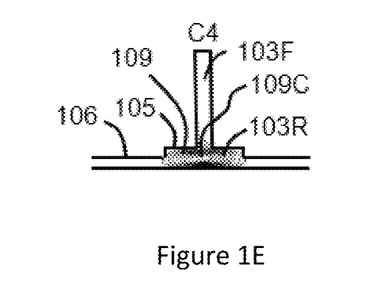

FIG. 1A schematically illustrates a perspective view of a portion of an optical device having an optical modulator made on large core silicon fin waveguide platform according to an embodiment of the present invention. The structure showed in FIG. 1 is one half of the optical device, the other half (not shown in FIG. 1 to avoid overcrowding) being symmetrical to the illustrated half with respect to a vertical plane that is perpendicular to the light propagation direction and located near the position labeled C4.

The height of the waveguides (the coupling waveguide and the modulator waveguide) is typical in the range of, but not limited to, 3 μm to a few μm depending on the specific design and the numerical aperture (NA) of the outside optical coupling system. The cross-sectional views of the waveguide structures and corresponding optical modes at various locations C1-C4 along the optical modulator are schematically illustrated in FIGS. 1B-1E, respectively. The optical modulator includes a starting single mode coupling waveguide 101, a mode transformer 102, and a single mode shallow modulator waveguide 103. The coupling waveguide 101 (see FIG. 1B) has an upper ridge 101U and a lower ridge 101L, where the top surface of the lower ridge 101L is the surface of a shallow trench 104 and the side wall of the lower ridge 101L is the side wall of a deeper trench 105. The mode transformer 102 (see FIGS. 1C and 1D) is formed within the deep trench 105. Within the region of the mode transformer 102, the deep trench 105 is bound on the sides by an even deeper trench 106, forming a tapered lower ridge of the mode transformer 102. The single mode fin waveguide (modulator waveguide) 103 (see FIG. 1E) has a double ridge structure including a fin 103F and a lower ridge 103R, the latter being formed by the two levels of trenches 105 and 106.

The coupling waveguide 101 and the modulator waveguide 103 are smoothly connected through the tapered mode transformer section 102. The coupling waveguide 101 and the mode transformer 102 form a two-stage horizontal taper structure. The first taper stage is the tapered width of lower ridge 101L of the coupling waveguide 101 (i.e., its width becomes smaller as it extends in the light propagation direction, see FIG. 1A, the tapered shape of the section of the trench 104 located between locations C1 and C2). The second taper stage is the tapered width of the mode transformer 102 (i.e., its width becomes smaller as it extends in the light propagation direction, see FIG. 1A, and compare FIGS. 1C and 1D). Although the coupling waveguide 101 and the modulator waveguide 103 look different, they are made on the same waveguide platform with the same top surface. The waveguide structure in the optical modulator section 103 has a fin structure with a tall and narrow fin 103F positioned on the top of a lower ridge 103R.

The typical depth of the trench 104 is, but not limited to, 1.2 μm for a 3 μm high waveguide, or 2.6 μm for a 5 μm high waveguide. And the typical depth of trench 105 is, but not limited to, 2.5 μm for a 3 μm high waveguide, or 4.2 μm for a 5 μm high waveguide. In most scenarios, the depth of trench 106 is around 0.1-0.2 μm deeper than the trench 105 to form a shallow etched ridge 103R. The width of the fin structure 103F is typically in the range of, but not limited to, 0.3 to 1.0 μm, and preferably, 0.5-0.7 μm, depending on the waveguide height. This offers an aspect ratio of the fin width to the fin depth typically in the range of 1:4 to 1:7, and preferably, 1:5 to 1:6, which is in the scope of the state of the art of silicon processing.

The optical modes evolution shown in FIGS. 1B-1E explains how the device works. In this example, the light signal is coupled into the optical device at the end near position C1 and travels through positions C2, C3 and C4 in that order. At position C1, which is located within the single mode coupling waveguide 101, the optical mode center 109C of the optical mode 109 is almost located at the center of the waveguide and optical mode has a large mode size. Along the light propagation direction of the coupling waveguide 101, the lower ridge 101L becomes progressively narrower until it is the same width as the upper ridge 101U (the latter remains constant); this squeezes the size of the optical mode 109. When propagating to the position C2, which is located within the mode transformer 102, the mode 109 has been squeezed to a much narrower shape by the tapered shape of the mode transformer 102. Further down to position C3, which is still located within the mode transformer 102 but closer to the modulator waveguide 103 than C2 is, the mode is squeezed to an even narrower shape and the mode center 109C begins to drop towards the lower ridge 105. Entering into the modulator section 103, the optical mode 109 continuously drops toward the lower ridge 103R, where all the way to position C4, the optical mode 109 is completely squeezed down to the lower ridge 103R. It is interesting to see that although the waveguide has a tall and narrow fin 103F on top of the lower ridge 103R, the optical mode 109 is still confined in the lower ridge 103R. Such a structure is essential to address both the coupling and modulation efficiency issues for its passively large core and actively small core structure. In other word, the described optical device having the modulator behaves like a large waveguide when coupling with outside components and a small waveguide when performing modulation function. Despite the existence of the top fin structure 103F, the modulator waveguide section 103 behaves similar to a waveguide having only the lower ridge 103R. Therefore, there is no need to truncate the fin structure to avoid transition loss due to mode-mismatch. In addition, the presence of the fin waveguide structure avoids fabricating a narrow and tall waveguide tip, especially when the waveguide tip width would have to be in the submicron range.

After position C4, the light signal continues to travel in the modulator section of the other half (nor shown) of the optical device, then travels through a second mode transformer into a second coupling waveguide of the other half, and exits at the other end. In terms of the location of the optical mode, the process that occurs in the second mode transformer and the second coupling waveguide is the opposite of the process that occurs in the first mode transformer and first coupling waveguide. In other words, the entire optical device includes two coupling waveguides at the two ends, a modulator waveguide, and two mode transformers respectively connecting the modulator waveguide to the two coupling waveguides. Either end of the device may be used as the input end.

In alternative embodiments, the second mode transformer and the second coupling waveguide on other half of the optical device may have different sizes (widths) than those of the mode transformer 102 and coupling waveguide 101 of the first half.

Figure 2A:
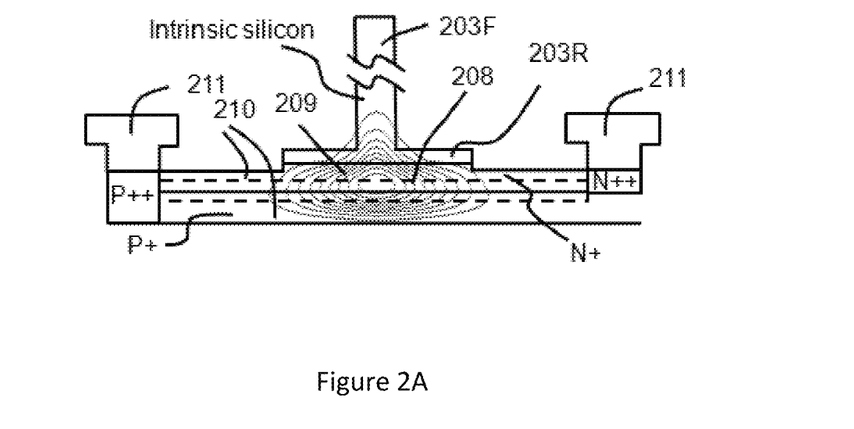
FIGS. 2A and 2B schematically illustrate the electro-optic region (depletion region of a silicon PN junction) arrangements for the optical modulator according to embodiments of the present invention.
Figure 2B:
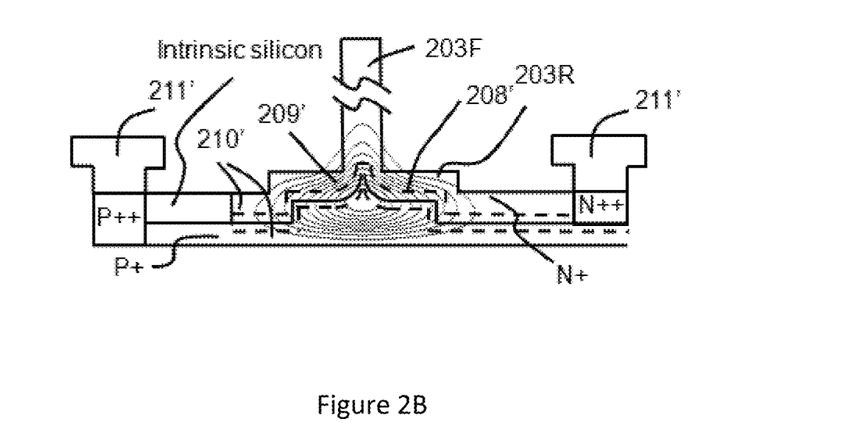

It is known that the modulation efficiency of an optical modulator is mainly determined by the overlap of the optical mode and the EO region. In that sense, the EO region is usually positioned at where the optical mode has the highest intensity. FIGS. 2A and 2B schematically illustrate the EO region (depletion region of a silicon PN junction) arrangements for the optical modulator according to embodiments of the present invention. The cross-sections are taken at a position along the modulator waveguide 103, such as position C4 (see FIG. 1A and FIG. 1E). Depending on the methods of fabricating the device, the EO region (between the dashed lines) 208/208' has different shapes. The structure illustrated in FIGS. 2A and 2B are fabricated based on epitaxial layers and implanted layers, respectively. No matter what kind of EO region is used, the optimized location to position the EO region 208/208' is always the place where the mode 209/209' has the highest intensity so that the optical property changes can have the strongest effect on the optical signal. In both scenarios, the optical mode 209/209' sits in the lower ridge 203R (corresponding to 103R in FIG. 1E) with very little energy penetration into the fin structure 203F (corresponding to 103F in FIG. 1E). This is the reason the EO region 208/208' is positioned mainly in the lower ridge 203R. The EO region 208/208' is sandwiched by the field source regions 210/210'. The EO region 208/208' is the depletion region of the PN junction. The field source regions 210/210' are N-doped and P-doped silicon layers.

When an electric field is applied to the EO region 208 through the field regions 210, the area (i.e. size) of the depletion region changes, which in turn changes the phase of the optical mode that propagates inside the waveguide. The electric field is vertically oriented inside the electro-optic region perpendicular to the surfaces of the field source regions and vertically across the PN junction interface. When accumulated for a long enough length the optical phase of the optical mode will induce a constructive or destructive combining through a Mach-Zehnder interferometer (MZI) structure to realize intensity modulation in response to the applied electric field.

The EO region 208/208' connects to the metal electrodes 211/211' through the horizontally arranged field source regions 210/210'. The metal electrodes 211/211' are positioned on opposite sides of the waveguide and are electrically connected to the field source regions 210/210', which are doped horizontal N+ and P+ layers extending in the direction perpendicular to the light traveling direction in the cross-sectional view as shown in FIGS. 2A and 2B. Heavily doped N++ and P++ layers are disposed below the metal electrode 211 to minimize ohmic contact loss. These heavily doped regions are positioned far enough from the lower ridge 203R that the optical mode cannot "see" the layers. Such arrangement makes the fabrication much easier and maintains the device performances.

FIGS. 3A-3D schematically illustrate the key process steps of fabricating the optical modulator structure illustrated in FIG. 2A according to an embodiment of the present invention. These figures are cross-sectional views taken at a position in the modulator waveguide section 103, e.g. at C4 of FIG. 1A, at different processing stages. The process begins with a substrate with epitaxial layers. From the bottom to top of the substrate, the layer arrangement is, silicon substrate and SiO$_2$ buffer layer (not shown in the figures), P+ silicon layer, N+ silicon layer, and intrinsic silicon layer. The thickness of the P+ silicon layer is chosen to make sure the depletion region of the PN junction is positioned where the EO effect should be the strongest. In most scenarios, the P+ layer doping level is smaller than that of the N+ layer, since holes in the P+ layer show stronger response than the electrons in the N+ layer. The typical thicknesses of the P+ and N+ layers are in the range of, but not limited to, 0.1 μm to 0.3 μm. The total thickness of the P+ and N+ layers is preferably less than the thickness of lower ridge 203R marked in FIG. 2A to reduce free carrier loss from unnecessarily doped areas. Note that the thickness of the lower ridge 203R is defined as the distance between the top surface of the lower ridge 203R (i.e. trench 105) and the lower boundary of the P+ silicon region.

Figure 3A:
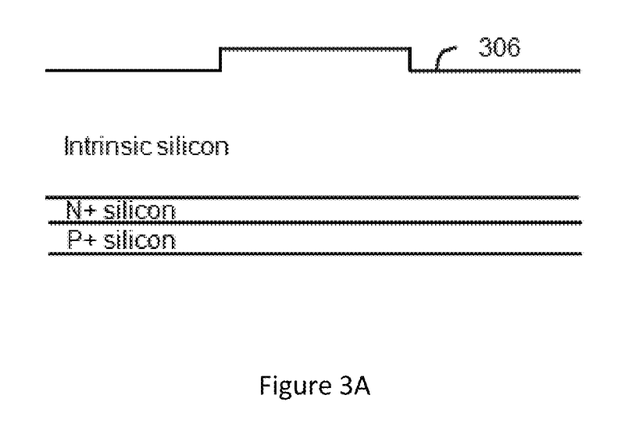
FIG. 3A-3D schematically illustrate the key process steps of fabricating the optical modulator structure illustrated in FIG. 2A according to an embodiment of the present invention.
Figure 3B:
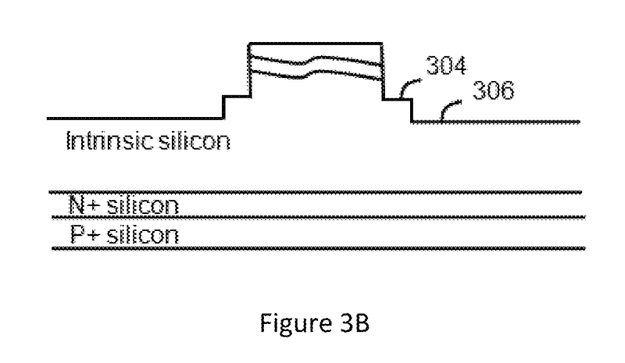
Figure 3C:
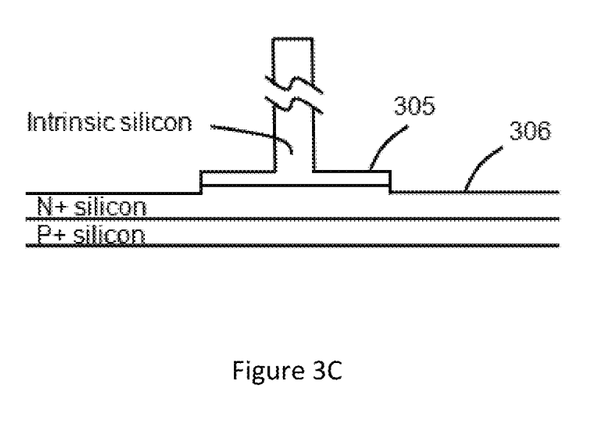
Figure 3D:
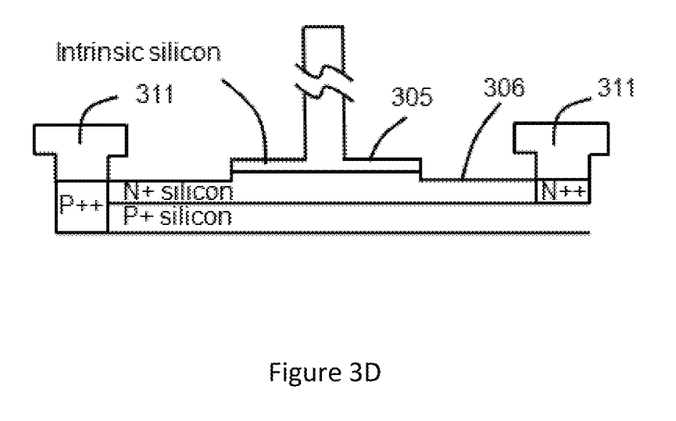

The substrate is under a first etch as shown in FIG. 3A to form a shallow trench 306, with typical depth in the range of, but not limited to, 0.1 to 0.2 μm. Only the areas labeled 106 in FIG. 1A are etched in this first etching step. The second trench 304 is etched in the next step as shown in FIG. 3B to form the upper ridge of the coupling waveguide. The areas labeled 104, 105 and 106 in FIG. 1A are etched in this second etching step. A self-aligned process is used to further etch the trench 305 to form the fin structure of the modulator. The areas labeled 105 and 106 in FIG. 1A are etched in this third etching step. As seen in FIG. 3C, after the third etching step, the wider top ridge in FIG. 3B is etched to the narrower top ridge, and the height of the surface 306 (corresponding to area 106 in FIG. 1A) is now below the boundary between the intrinsic silicon and the N+ silicon. Note that in FIG. 2A, the solid horizontal line in the region 203R indicates the boundary between the intrinsic silicon and the N+ silicon. Finally, the heavily doped N++ and P++ layers are deposited below the metal contact 311 to finish the key process steps (FIG. 3D, taken at position C4).

In actual fabrication, since the width of the fin structure is small, there is a possibility that the final width of the fin structure is larger than the designed width. It can result in the optical mode center shifting up into the fin structure 203F. An additional mechanism that can result in the mode center shifting up is the footings at the bottom of the fin structure 203F caused by non-ideal etching condition. Such effect will compromise the modulation efficiency of the modulator. FIG. 2B is an alternative structure to solve those problems. In the structure shown in FIG. 2B, the boundary between the doped N+ and P+ layers is not flat but is higher in a center region within the lower ridge 203R, and even higher at the center region below the fin structure 203F. The shape of the EO region (depletion region of the PN junction) 208' as indicated by the dashed lines follow the shape of the P+/N+ boundary.

Figure 4A:
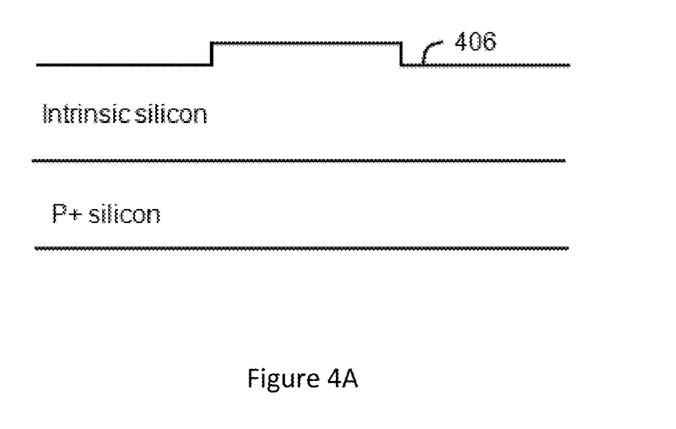
FIG. 4A-4D schematically illustrate the key process steps of fabricating the optical modulator structure illustrated in FIG. 2B according to an embodiment of the present invention.
Figure 4B:
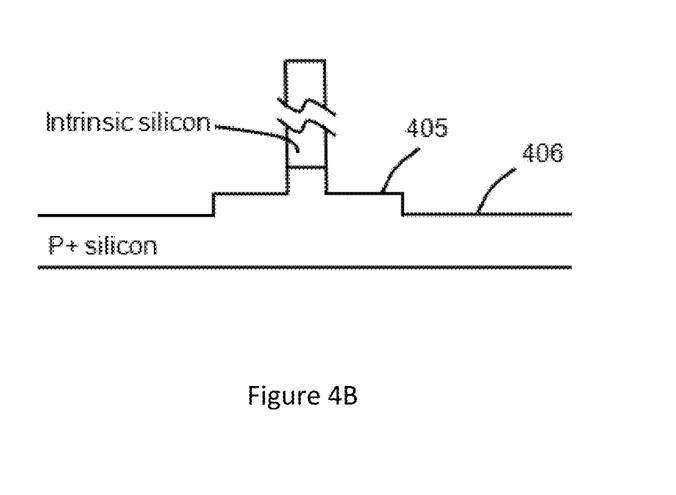
Figure 4C:
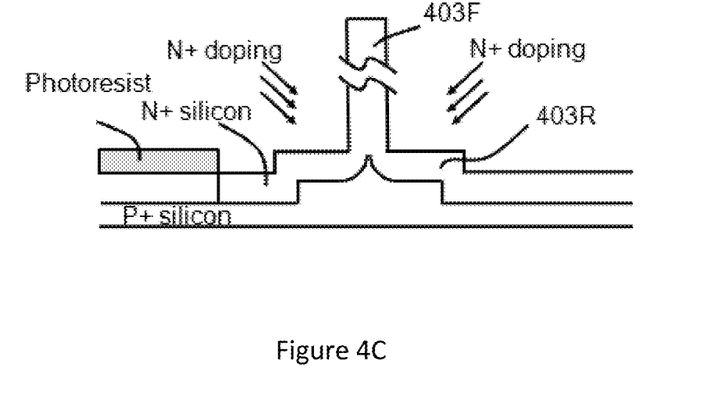
Figure 4D:
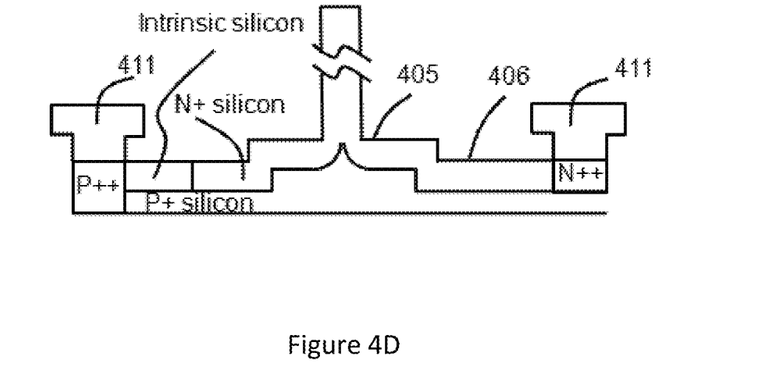

FIGS. 4A-4D schematically illustrate the key process steps of fabricating the optical modulator structure illustrated in FIG. 2B according to an embodiment of the present invention. The process again begins with an epitaxial substrate. The difference from FIG. 2A structure is the layer arrangement: only the P+ silicon layer is epitaxial grown in this case. The thickness of the P+ layer is chosen to be larger than the thickness of the lower ridge 203R marked in FIG. 2B, with typical value in the range of, but not limited to, 0.5 μm to 1.5 μm depending on the fabrication resolution and the implanting penetration depth. The processes begins with a few etching steps shown in FIG. 4A and FIG. 4B, to form the shallow trench 406 (where areas corresponding to areas 106 in FIG. 1A are etched), coupling waveguide trench 404 (not shown in the figure, similar to the second trench etching shown in FIG. 3B, where areas corresponding to areas 104, 105 and 106 in FIG. 1A are etched), and fin trench 405 (where areas corresponding to areas 105 and 106 in FIG. 1A are etched). After the third etching step, the surfaces of both the areas 105 and 106 are below the boundary between the intrinsic silicon and the P+ silicon (see FIG. 4B). A major difference between this method and the method of FIGS. 3A-3D is the doping step shown in FIG. 4C, where most areas of the device are covered by photoresist with only the modulator waveguide area 103 exposed. The exposed area is preferably asymmetric (the left side is covered with photoresist in this example) to reduce unnecessary capacitance in the unused area. The modulator waveguide undergoes an angled N+ implantation (for example but not limited to 45 degree) where the angle points from the outside toward the lateral center of the ridge 403R. The doping level is chosen to compensate the original P+ doping in the upper area of the lower ridge 203R and form the designed PN junction N+ doping level. The implanting depth is chosen to from the depletion region of the PN junction at the mode center area. Due to the angled implantation, the fin structure 203F is N+ doped. Fortunately, the doped fin structure does not introduce more free-carrier loss since only a small portion of the optical mode "sees" the doping in the fin structure 203F. The angled implantation scheme results in a unique upside-down "V" shaped PN junction interface. Such shaped PN junction can compensate the modulation efficiency loss due to the mode center shifting up to the fin structure 203F. Finally, the heavily doped N++ and P++ layers are deposited below the metal contact 411 to finish the key process steps (FIG. 4D).

It will be apparent to those skilled in the art that various modification and variations can be made in the optical system and related fabrication methods of the present invention without departing from the spirit or scope of the invention. Thus, it is intended that the present invention cover modifications and variations that come within the scope of the appended claims and their equivalents.

What is claimed is:

1. An optical device, comprising:
    a silicon on insulator substrate;
    a silicon optical coupling waveguide on the substrate for coupling light in or out of the optical device, the optical coupling waveguide being configured to guide a light in a form of optical mode, the optical coupling waveguide having a double-ridge structure including a lower ridge with a first width and an upper ridge on top of the lower ridge with a second width which is narrower than the first width;
    a silicon fin optical modulator on the substrate, having a double-ridge structure including a lower ridge and a tall and narrow fin structure on top of the lower ridge, the optical modulator including an electro-optic modulation region inside the lower ridge, the optical modulator being configured to guide a light with a majority portion of the light confined inside the lower ridge, at least a portion of the light overlapping with the electro-optic modulation region, the optical modulator including field source regions configured to sandwich the electro-optic region to apply an electric field across the electro-optic region, wherein at least one optical property of the electro-optic region changes in response to the electric field applied to the electro-optic region; and
    a silicon mode transformer on the substrate for optically and physically connecting the optical coupling waveguide and the optical modulator.

2. The optical device of claim 1, wherein the electro-optic modulation region is a depletion region of a vertically oriented silicon PN junction formed by doping p-type and n-type dopants on each sides of the junction.

3. The optical device of claim 1, wherein the lower ridge of the optical coupling waveguide becomes narrower as it extends in a light propagation direction, and the mode transformer becomes narrower as it extends in the light propagation direction, wherein that the majority portion of the light gradually shifts from the upper ridge of the optical coupling waveguide at an incident end of the optical device to the lower ridge of the optical modulator.

4. The optical device of claim 1, wherein the optical property change in response to the electric field is an optical refractive index change induced by free carrier dispersion effect of a PN junction.

5. The optical device of claim 1, wherein the optical modulator further includes metal electrodes positioned on opposite sides of the optical modulator and electrically connected to the field source regions which are doped horizontal layers extending in a direction perpendicular to the light propagation direction.

6. The optical device of claim 5, wherein the field source regions are p-doped and n-doped silicon regions.

7. The optical device of claim 5, wherein a vertically oriented electric field is formed inside the electro-optic region perpendicular to surfaces of the field source regions and vertically across the PN junction interface.

8. The optical device of claim 5, wherein the metal electrodes are connected with the doped horizontal layers through heavily doped regions positioned on opposite sides of the optical modulator.

9. The optical device of claim 1, wherein the electro-optic region has a shape that is higher in a center region below the fin structure.

10. The optical device of claim 1, wherein the fin structure has a width-to-height ratio from 1:4 to 1:7.

11. The optical device of claim 1, wherein the fin structure has a width of 0.3 μm to 1.0 μm.

12. The optical device of claim 1, further comprising
    a second silicon optical coupling waveguide on the substrate for coupling light in or out of the optical device, the second optical coupling waveguide being configured to guide a light in a form of optical mode, the second optical coupling waveguide having a double-ridge structure including a lower ridge with a first width and an upper ridge on top of the lower ridge with a second width which is narrower than the first width; and
    a second silicon mode transformer on the substrate for optically and physically connecting the second optical coupling waveguide and the optical modulator.

* * * * *